United States Patent Office 3,739,034
Patented June 12, 1973

3,739,034
PRODUCTION OF NONIONIC DETERGENTS
Joseph A. Cahill, Philadelphia, and Joseph A. Meyers III, Springfield, Pa., and Richard W. Sauer, Cherry Hill, N.J., assignors to Atlantic Richfield Company, New York, N.Y.
No Drawing. Continuation-in-part of abandoned application Ser. No. 878,223, Nov. 19, 1969. This application Mar. 17, 1972, Ser. No. 235,798
Int. Cl. C07c 41/02
U.S. Cl. 260—615 B         6 Claims

ABSTRACT OF THE DISCLOSURE

Nonionic detergents are prepared by the liquid phase air oxidation of normal paraffins, reduction of the oxidate, fractionation of the reduced oxidate to remove the lighter compounds, and reacting the bottoms fraction with ethylene oxide to produce the desired nonionic detergents. This process offers a convenient method for the production of detergents from paraffins.

CROSS REFERENCE TO RELATED APPLICATION

This application is a continuation-in-part of our co-pending application Ser. No. 878,223, filed Nov. 19, 1969 and now abandoned, entitled Production of Nonionic Detergents.

BACKGROUND OF THE INVENTION

Field of the invention

This invention relates to a method for producing nonionic detergents from normal paraffins and, more particularly, it relates to a method for oxidizing normal paraffins in the liquid phase, reducing the oxidate, fractionating the reduced oxidate to obtain a heavy bottoms fraction and reacting the heavy bottoms fraction with ethylene oxide to produce the desired nonionic detergent.

Prior art

It is known in the prior art to oxidize paraffins in the liquid phase to produce complex mixtures of oxygenated products together with unreacted paraffins. An article by R. A. Brown et al. in Analytical Chemistry, vol. 39, No. 14, December 1967, pp. 1805 et seq. entitled Analysis of Oxidized Paraffins by Combined Techniques teaches that the major oxygenated compounds from liquid phase oxidation of $C_{12}$-$C_{15}$ paraffins are secondary alcohols, ketones and diols with smaller amounts of primary alcohols, acids, esters and lactones together with possibly ketoalcohols and hydroxyesters.

Brown et al. in their analytical method of identifying the oxygenated compounds present, separated the unreacted paraffins from the oxidized compounds by silica gel. The unreacted paraffins were eluted from the silica gel by the use of pentane, methylene chloride was used to elute alcohols and ketones and finally methanol was used to elute the diols.

It is also known that the oxygenated compounds can be hydrogenated, i.e. reduced, utilizing hydrogen and a variety of catalysts.

Applicants reduce their oxidate-unreacted hydrocarbon mixture and dilute the reduced oxidate-hydrocarbon mixture with a $C_5$ to $C_7$ normally liquid saturated hydrocarbon. The diluted mixture is then passed through silica gel. The diluent and unreacted hydrocarbons pass through the gel without being adsorbed whereas the reduced oxide is adsorbed and is eluted with methanol.

It is also known to react alkyl phenols and similar compounds with several moles of ethylene oxide to produce excellent nonionic detergents. No prior art is known, however, which shows starting with a normal paraffin and by oxidation, reduction, silica gel separation, fractionation and ethoxylation, producing a nonionic detergent equal to commercial nonionic detergents.

SUMMARY OF THE INVENTION

In accordance with this invention a normal paraffin having from 10 to 20 carbon atoms in the molecule or mixtures thereof is oxidized in the liquid phase with molecular oxygen, preferably air to produce an oxidate. The oxidate consists of a complex mixture of oxygenated compounds together with unreacted paraffin hydrocarbon. This mixture of compounds is reduced by hydrogenation or similar means and the reduced oxidate thus obtained is freed of unreacted paraffin hydrocarbons by silica gel separation techniques and fractionated to remove at least 75 weight percent of the reduced oxidate as an overhead fraction, leaving a bottoms fraction comprising 25 weight percent or less, preferably from 18 to 25 weight percent of the original reduced oxidate. This reduced oxidate bottoms fraction is reacted with from 10 to 15 moles of ethylene oxide per mole of the reduced oxidate bottoms. The resulting ethoxylated material has excellent detergency properties equivalent to that of standard commercial nonionic detergents.

It is an object of this invention therefore to provide a method for the production of nonionic detergents from straight chain paraffin hydrocarbons.

It is another object of this invention to provide a method for the conversion of straight chain paraffin hydrocarbons into ethoxylated compounds having excellent detergency properties.

It is another object of this invention to provide a method for the conversion of straight chain paraffin hydrocarbons into nonionic detergents having excellent detergency properties and which are easily biodegradable.

Other objects of this invention will be apparent from the description of the preferred embodiments which follows and from the claims.

DESCRIPTION OF THE PREFERRED EMBODIMENTS

The paraffin hydrocarbons which are utilized in the process of this invention are those which are straight chain and contain from 10 to 20 carbon atoms in the molecule.

Straight chain paraffin hydrocarbons are found in petroleum fractions, in particular kerosene fractions and are separated from non-straight chain compounds by the use of molecular sieves or by urea adduction in accordance with well known processes. The molecular sieve separation process is particularly useful since it can be used to produce high purity, straight chain paraffins at low cost and at excellent yields. Such processes are available commercially. The desired molecular weight range of the straight chain paraffins can be obtained by fractionation. Alternatively the kerosene can be fractionated to the desired range and the straight chain compounds separated therefrom by molecular sieves or urea adduction.

The desired straight chain paraffin fraction is oxidized in the liquid phase utilizing molecular oxygen, conveniently in the form of air, at temperatures in the range of from about 100° C. to 200° C. although temperatures outside of this range can be employed. The oxidation may be either catalytic or non-catalytic but in general catalytic oxidation is preferred since it gives excellent results and yields of the oxidate.

The catalysts employed are preferably the heavy metal catalysts which are soluble in the hydrocarbon phase, for example, manganese naphthenate, cobaltous acetate and like catalysts. In addition, other catalytic compounds such as hydrobromic acid can be used in conjunction with the heavy metal compounds.

The oxidate resulting from the liquid phase oxidation contains both oxidized paraffin hydrocarbons and unreacted paraffins. The amount of oxidized paraffin obtained is determined by the severity of the oxidation conditions and the reaction time employed, but the amount is not critical. In general conditions and times giving about 50 percent conversion are suitable.

The oxidate-unreacted hydrocarbon mixture is then reduced by any convenient method, for example by catalytic hydrogenation in the presence of platinum, palladium, ruthenium, rhodium and the like on supports such as carbon or alumina. Another excellent catalyst for this purpose is copper chromite.

The hydrogenation can be carried out at temperatures in the range of from 25° C. to about 150° C. at pressures ranging from 100 p.s.i. to 5000 p.s.i. Reaction times of from ½ hour to 2½ hours are generally sufficient. A somewhat more preferred range of conditions are from 75° C. to 140° C. with pressures ranging from 500 p.s.i. to 2000 p.s.i.

The oxidate can also be reduced with compounds such as lithium aluminum hydride, $LiAlH_4$. The lithium aluminum hydride is preferably suspended in a solvent such as diethyl ether and ambient or room temperature can be employed. Unreacted catalyst can be destroyed with water.

After the reduction step the reduced oxidate is separated from the unreacted hydrocarbon preferably by percolation through silica gel. In general, this is facilitated by dissolving the reduced oxidate-unreacted hydrocarbon mixture in a hydrocarbon diluent. The hydrocarbon diluent is a $C_5$-$C_7$ normally liquid saturated hydrocarbon such as pentane, n-hexane, isohexane, cyclohexane, the heptanes and the like or mixtures thereof, with n-hexane being particularly suitable. The reduced compounds are adsorbed on the silica gel whereas the hydrocarbons pass through the gel, the reduced compounds can then be eluted from the gel with methanol. The solvent diluent and can then be removed from the respective fractions and the hydrocarbon fraction recycled if desired.

The reduced compounds are distilled, preferably at reduced pressure, e.g. 0.5 mm. Hg pressure or less to remove an overhead fraction constituting at least about 75 weight percent of the total mixture. A range from 0.01 to 1.5 mm. of Hg is suitable. The bottoms fraction should preferably amount to between 18 and 25 weight percent of the total mixture.

To the bottoms fraction is added a small amount of potassium hydroxide catalyst. In general, the amount of catalyst is not critical but a convenient quantity is from 0.05 to 0.3 weight percent of the weight of the bottoms fraction. The bottoms fraction and catalyst mixture is heated to about 150° C. while being purged with nitrogen and thereafter ethylene oxide is bubbled through the mixture until the desired gain in weight is noted, corresponding to the number of moles of ethylene oxide reacted per mole of reduced material. The reaction temperature is preferably maintained between about 185° C. and 210° C. during addition of the ethylene oxide.

The ethoxylated compounds produced in the manner described were found to have detergency values equivalent to that of a standard commercial nonionic detergent and in addition to have excellent biodegradability. The following examples are provided to illustrate the invention in further detail.

EXAMPLE I

There was charged to an oxidation tube 169.5 grams of n-cetane, 3.75 grams of cobaltous acetate, 4.05 grams of hydrobromic acid (30 weight percent concentration in acetic acid). The oxidation tube was heated for 4¼ hours at 110° C. while air was bubbled through the solution at the rate of 410 ml. per minute. The temperature was increased to 135° C. and heating was conducted for an additional 14¾ hours with air being bubbled through at the same rate. Gas-liquid chromatographic analysis showed that approximately 50 weight percent of cetane had been reacted at the end of this time. Longer or shorter reaction times can be used with respective increased or decreased amounts of oxidate. The final product was found to contain 169 grams of an oil layer and 19 grams of a water layer. A second run was made in the same manner and the oil layer from the second run was composited with the oil layer from the first run. After the oil was filtered it was water washed and it was found that this oxidate-cetane mixture had acid and ester numbers of 44 and 48 (mg. KOH per gram) respectively.

EXAMPLE II

A 150 gram sample of the washed oxidate-cetane mixture from Example I was added dropwise and with vigorous stirring to 21 grams of lithium aluminum hydride ($LiAlH_4$) powder suspended in 400 ml. of diethyl ether. The temperature was maintained near room temperature during this addition. The unreacted $LiAlH_4$ was destroyed by the slow addition of water.

The reduced oxidate-cetane mixture was recovered by evaporation of the ether layer and 140 grams of reduced oxidate-cetane mixture was obtained.

EXAMPLE III

The 140 grams of reduced oxidate-cetane obtained in Example II was diluted with 500 ml. of hexane and passed downwardly through a bed of silica gel (320 grams-pre-wet with hexane) to separate the unreacted cetane from the reduced oxidate. The reduced oxidate was adsorbed in the silica gel column while the cetane passed through the column along with the hexane. The reduced oxidate was eluted from the silica gel column by washing with methanol. The solvents were separated from the respective fractions by vaporization and it was found that 77 grams of cetane were recovered and 63 grams of reduced oxidate.

EXAMPLE IV

A 55 gram sample of the reduced oxidate from Example III was charged to a distillation column and distilled at a pressure of 0.5 mm. of mercury. An overhead fraction amounting to 41 grams was obtained having a boiling point range of 42° C. to 110° C. at 0.5 mm. mercury pressure. The bottoms fraction amounted to 13 grams and had a boiling point greater than 110° C. at 0.5 mm. mercury.

EXAMPLE V

An 8 gram sample of the bottoms fraction obtained in Example IV was placed in a 50 ml. tube together with 0.2 gram of KOH as the catalyst. The contents of the tube were heated to about 150° C. while being purged with nitrogen and then ethylene oxide was bubbled through until the desired gain in weight was obtained equal to 10 moles of ethylene oxide per mole of the reduced oxidate which was estimated to have an average molecular weight of 270. The temperature was maintained between 190° C. and 205° C. during the addition of the ethylene oxide. After 10 moles/mol of reduced oxidate had reacted a small sample of the reaction product was removed and ethlene oxide added to the remainder until 13 moles/mole of oxidate had reacted. Again, a small sample was removed and ethylene oxide added to the remainder until 15 moles/mole of reduced oxidate had been reacted. The entire addition of ethylene oxide required about 2 hours. The 10, 13 and 15 moles/mole products were designated, Sample No. 1, Sample No. 2 and Sample No. 3, respectively.

EXAMPLE VI

The 3 ethoxylated products obtained in Example V were compared with a standard commercial nonionic detergent in a standard detergent formulation which had the following composition in weight percent:

| | |
|---|---|
| Sodium tripolyphosphate | 40 |
| Nonionic detergent or Sample | 12 |
| Sodium metasilicate | 7 |
| Sodium sulfate | 40 |
| Sodium carboxy methylcellulose | 1 |

These detergent formulations were tested in a standard Launderometer apparatus. The procedure is set forth in detail in U.S. Pat. No. 3,398,163 starting at line 58 in column 3 and continuing through line 73 in column 4.

The standard nonionic is a well-known commercially available compound which is an ethoxylated branched chain alkyl phenol sold under the trade name "Triton X-100." The data obtained from the detergent testing is set forth in the table.

TABLE

| | Detergency value | Foam height, ⅛ inch |
|---|---|---|
| Non-ionic standard | 80 | 4 |
| Sample: | | |
| #1 (10 moles/mole) | 80 | 2 |
| #2 (13 moles/mole) | 80 | 2 |
| #3 (15 moles/mole) | 80 | 2 |

These results show that the non-ionic detergents made in accordance with the process of this invention are equivalent to the standard commercial non-ionic detergent.

The biodegradability of various commercial non-ionic detergents are reported in the paper by Huddleston and Allred entitled "Biodegradability of Ethoxylated Alkyl Phenol Surfactants" presented at the American Oil Chemists Society Meeting, Houston, Tex., Apr. 26, 1965. The authors employed and described the shake flask colorimetric method using ammonium cobaltothiocyanate complex.

The three samples described above prepared in Example V were tested by this method and it was found that their biodegradability is better than that of the ethoxylated straight chain alkyl phenol surfactants tested and reported by Huddleston and Allred and which are being produced commercially as biodegradable non-ionic detergents.

We claim:
1. A method for producing nonionic, easily biodegradable detergents from straight chain paraffin hydrocarbons having 10 to 20 carbon atoms in the molecule which comprises oxidizing the straight chain paraffin hydrocarbon in the liquid phase at temperatures in the range of from about 100° C. to 200° C. with molecular oxygen to produce an oxidate-unreacted hydrocarbon mixture, reducing said oxidate-unreacted hydrocarbon mixture to produce a reduced oxidate-unreacted hydrocarbon mixture, separating said reduced oxidate from said unreacted hydrocarbon by dissolving said reduced oxidate-unreacted hydrocarbon mixture in a $C_5$–$C_7$ normally liquid saturated hydrocarbon, passing said hydrocarbon solution of said mixture through silica gel to adsorb said reduced oxidate on said silica gel to adsorb said reduced oxidate on said silica gel with said unreacted hydrocarbons passing through said silica gel, eluting said adsorbed reduced oxidate from said gel with methanol, vaporizing said methanol from said reduced oxidate, fractionating said reduced oxidate to obtain a bottoms fraction not more than 25 weight percent of said total reduced oxidate, and contacting said bottoms fraction with from 10 to 15 moles of ethylene oxide per mole of said reduced bottoms at a temperature between about 185° to 210° C. in the presence of a potassium hydroxide catalyst to produce the desired nonionic detergent.

2. The method according to claim 1, wherein said straight chain paraffin hydrocarbons are catalytically oxidized in the presence of cobaltous acetate and hydrobromic acid.

3. The method according to claim 1 wherein the reduction step is catalytic hydrogenation in the presence of a hydrogenation metal catalyst consisting of platinum, palladium, ruthenium or rhodium supported on carbon or alumina.

4. The method according to claim 1 wherein the reduction is carried out with lithium aluminum hydride.

5. The method according to claim 1 wherein the reduced oxidate is fractionated to give a bottoms fraction amounting to from 18 to 25 weight percent of the total reduced oxidate.

6. The method according to claim 1 wherein the normal paraffin hydrocarbon is cetane.

References Cited

UNITED STATES PATENTS

| | | | |
|---|---|---|---|
| 1,921,381 | 8/1933 | Beller et al. | 260—638 A UX |
| 2,228,929 | 1/1941 | Reibutiz | 260—615 B X |
| 3,391,190 | 7/1968 | Kilshelner et al. | 260—632 CX |
| 3,060,046 | 10/1962 | Kaup et al. | 260—632 CU |
| 2,726,255 | 12/1955 | Walker | 260—632 CX |
| 2,733,215 | 1/1956 | Ruff | 260—615 B |
| 1,970,578 | 8/1934 | Schoeller et al. | 260—456 RU |

FOREIGN PATENTS

| | | | |
|---|---|---|---|
| 1,045,157 | 10/1966 | Great Britain | 260—638 A |

OTHER REFERENCES

Satowski et al.; Ind. & Eng. Chem., 49, No. 11, p. 1875–1878, 1957.

Bios: No. 748, Item No. 22, 1946, Manufacture of Fatty Acid by Oxidation of Paraffins, pp. 1–115.

Krajkenan: Manufacturing Chemist, April 1951, XXII, p. 147–152.

Kozlova et al.: Chem. Abst. 62, 2686f, 1965.

HOWARD T. MARS, Primary Examiner

U.S. Cl. X.R.

252—Dig. 1, 89; 260—632 C, 638 A